Dec. 5, 1967 W. S. WILSON Re. 26,318
CLOSURE
Original Filed Nov. 2, 1962
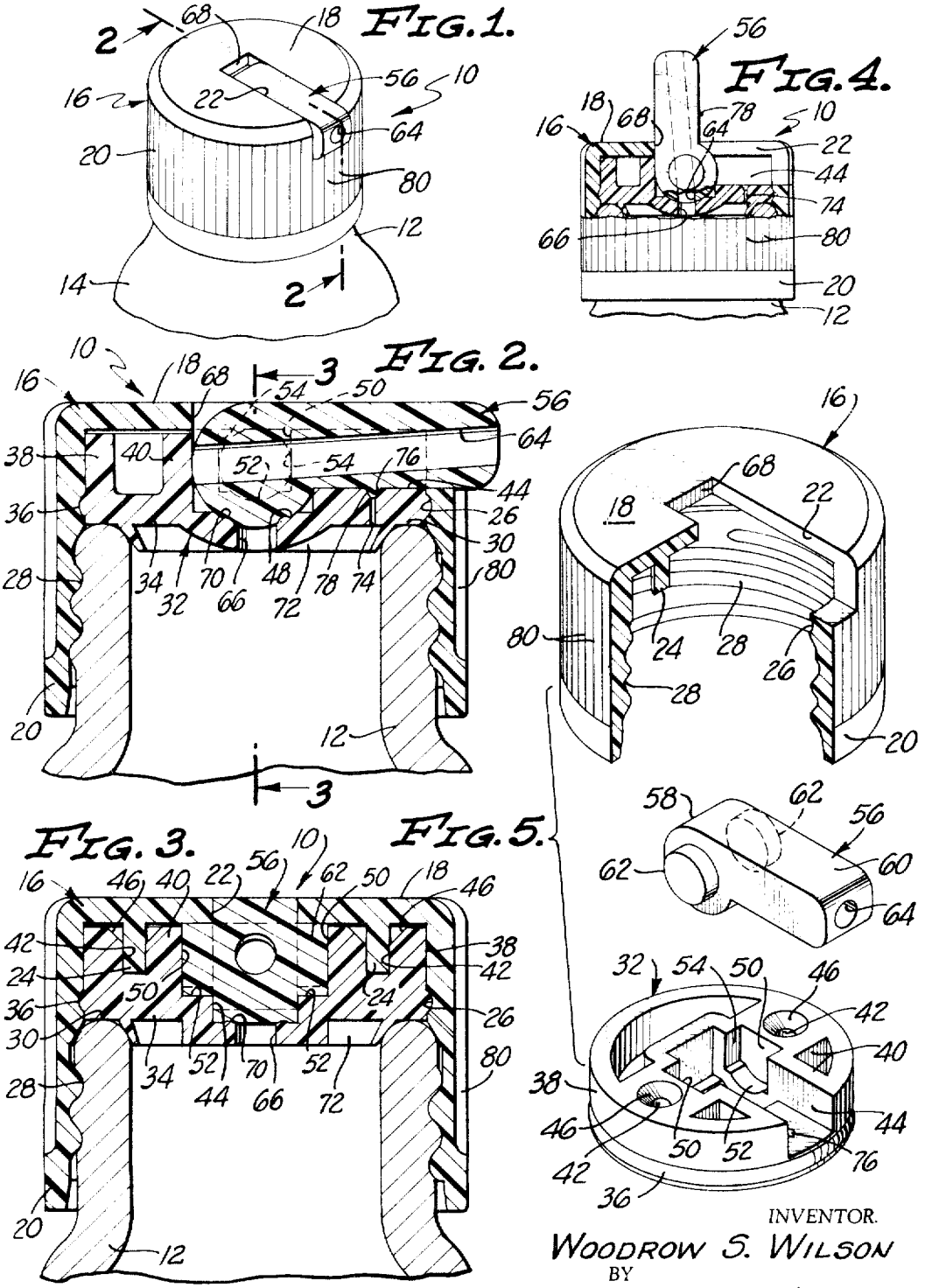
INVENTOR.
WOODROW S. WILSON
BY
EDWARD D. O'BRIAN
ATTORNEY United States Patent Office Re. 26,318
Reissued Dec. 5, 1967

26,318
CLOSURE

Woodrow S. Wilson, Pasadena, Calif., assignor to Polytop Corporation, Slatersville, R.I., a corporation of Massachusetts Original No. 3,163,337, dated Dec. 29, 1964, Ser. No. 235,092, Nov. 2, 1962. Application for reissue Apr. 20, 1965, Ser. No. 457,540
12 Claims. (Cl. 222—512)

Matter enclosed in heavy brackets [ ] appears in the original patent but forms no part of this reissue specification; matter printed in italics indicates the additions made by reissue.

This invention relates to new and improved closures and more specifically to closures which are intended to be attached to a container such as a bottle on a permanent basis and which are designed to be used in dispensing material from such container while mounted upon it.

Such closures are frequently referred to as "dispensing closures" since they are used in dispensing the contents of a container. A large number of different types of dispensing closures have been developed and used in the past. Many of these prior dispensing closures have been of a commercially acceptable category. However, none of these prior dispensing closures are considered to be entirely acceptable and desirable as possible. This is considered to be evidenced by the fact that there is a continued commercial demand for new dispensing closures which are better than prior devices of the same type in any one of a number of different regards.

For any dispensing closure to be acceptable commercially at the present time, it must be capable of being manufactured in quantity at a comparatively nominal cost. This alone is not enough to make a closure commercially acceptable. In order to be acceptable, such a closure must have an external configuration of such a character that it can be easily and conveniently attached to a container such as a bottle using automatic assembly equipment, and this configuration must be such that the closure itself is esthetically appealing. Further, a commercially acceptable closure must be constructed in such a manner that its exterior appearance can be easily changed without changing the other constructional details of the closure so that the products of different manufacturers using the same closure will have a different appearance.

A commercially acceptable dispensing closure must combine not only the aforegoing characteristics into a single structure but it must include other features such as ease of use and reliability of operation. Thus, to be acceptable a closure of the dispensing type must be capable of being easily operated by the user. It must also be constructed in such a manner that it is immune from the effects of leakage with not only common materials but with various low viscosity solutions of an "impossible to seal" variety. Preferably a dispensing closure should also be constructed so as to facilitate the stacking of containers upon which such closures are used and so that if desired by a customer, air may be vented through the closure in order to facilitate pouring.

A broad general object of the present invention is to provide new and improved closures of the dispensing variety having these commercially desired characteristics and features combined into a single unit. Thus, various objects of the invention are to provide dispensing closures having a desired external configuration, which can be manufactured at a comparatively nominal cost, which are easy to use by both one who assembles such closures and by the ultimate users of such closures, and which are effectively immune against leakage problems.

Various other objects of this invention will be apparent from a detailed consideration of the preceding discussion, the remainder of this specification, the appended claims and the accompanying drawing in which:

FIG. 1 is an isometric view of a presently preferred embodiment of a dispensing closure of this invention in use upon the neck of a bottle;

FIG. 2 is a cross-sectional view taken at line 2—2 of FIG. 1 of the drawing;

FIG. 3 is a cross-sectional view taken at line 3—3 of FIG. 2 of the drawing;

FIG. 4 is a partial sectional view corresponding to FIG. 2 showing the dispensing closure illustrated in an "open" or dispensing configuration; and FIG. 5 is an exploded isometric view, partially in section illustrating the construction of the dispensing closure illustrated in the preceding figure.

From a careful consideration of this drawing and of the specification it will be realized by those skilled in the closure field that the precise closure illustrated in the drawing can be modified through the use of routine engineering skill or ability so as to change various minor matters such as appearance and the like.

As an aid to understanding the invention, it can be stated in essentially summary form that it concerns closures, each of which includes cap, fitment and spout members which are assembled together so that the spout is located generally within the cap member and is held in place with respect to the cap member by the fitment member in such a manner that the spout member is capable of being rotated with respect to both the cap and fitment members between open and closed positions. In a closure of this invention the fitment member contains an opening which is adapted to be aligned with an elongated passage in the spout in an open position.

The actual details of this invention will be more fully apparent from a detailed consideration of the accompanying drawing. In the drawing there is shown a closure 10 mounted upon the neck 12 of a conventional bottle 14. This closure includes a cap member 16 having a flat top 18 and a dependent skirt 20 which extends from one side of the top 18. In the closure 10 this top 18 is preferably of a disc-like shape, and the skirt 20 is preferably of a cylindrical configuration. A slot 22 extends from the central region of the top 18 across this top to one side of it and continues a comparatively short distance into the edge of the skirt 20 secured to the top 18.

Two alignment studs 24 are preferably located on the top 18 so as to extend a comparatively short distance from the surface of this top 18 enclosed by the skirt 20 generally towards the extremity of the skirt 20 remote from the top 18. Preferably, these studs 24 are located on opposite sides of the slot 22 generally within the interior of the cap member 16. Within the interior of the skirt 20 there is formed an internal groove 26 having a rounded cross-sectional configuration. This groove 26 extends completely around the interior of the skirt 20 parallel to the top 18 and is spaced with respect to the skirt 20 so as to be positioned sufficiently far from the top 18 so that it is not intersected by the slot 22.

Conventional threads 28 are preferably located within the interior of the skirt 20 on the side of the groove 26 remote from the top 18. These threads 28 are adapted to mate with corresponding threads (designated by the same numeral 28 in the drawing in the interest of clarity) which are located upon the neck 12 of the bottle 14. This neck includes an upper edge 30 which fits against a fitment member 32 forming a part of the closure 10.

This fitment member 32 includes a generally disc shaped body portion 34 from the exterior of which projects a curved flange 36. This flange 36 extends completely around the exterior of the body portion 34 and conforms in shape to the shape of the interior of the groove 26 but is on smaller dimension than this groove 26; it is designed so as to fit within the interior of this groove. The body portion 34 also includes a cylindrically shaped extension 38 which extends upwardly from it towards the top 18; this extension may fit against the top 18 when the flange 36 fits within the groove 26. Preferably however, it is dimensioned so as to be opened from the top 18 a short distance when the flange 36 is within the groove 26. Preferably this extension 38 is formed so as to fit closely against the interior of the skirt 20. The body portion 34 also carries extensions or internal walls 40 which extend from it and from the interior of various portions of the extension 38. These walls preferably are of the same height or depth as the extension 38.

Within the walls 40 there are formed alignment holes 42 which are spaced so that they can receive the studs 24 in order to assure the positioning of a cavity 44 defined by certain of the walls 40 with the slot 22. Preferably the holes 42 include beveled entrance walls 46 so as to facilitate the location of the studs 24 in a proper position. The cavity 44 preferably corresponds in width to the width of the slot 22 and extends to a depth corresponding to the distance the slot 22 extends into the skirt 20.

At the end of the cavity 44 remote from the exterior edges of the body portion 34 there is located a cylindrical wall 48 curved considerably less than 180° about an axis which extends parallel to the top 18 when the fitment member 32 is assembled with respect to the top 18 and which is located so as to extend across the interior of the cavity 44. The cavity 44 also includes side slots or openings 50, each of which has a cylindrical wall 52 extending no more than 180° around this same axis and each of which has parallel side entrance walls 54 leading to the ends of the wall 52. Each of the walls 54 is preferably the length of the radius of the corresponding wall 52 or slightly shorter than this radius.

In the closure 10 the fitment member 32 is employed so as to hold a spout member 56 with respect to the cap member 16. This spout member 56 has a cylindrical central portion 58 of the same or slightly greater diameter than the diameter of the wall 48. It also has an elongated spout 60 which is attached to this central portion 58 so as to extend more or less tangentially from it. The spout 60 is preferably dimensioned so as to be capable of being moved through the slot 22 and so as to extend from the slot in a "closed" position as indicated in FIGS. 1 and 2 of the drawing a short distance beyond the skirt 20. With this construction the spout 60 lies essentially "flush" with the exposed surface of the top 18.

The spout member 56 has aligned cylindrical trunnions or shafts 62 which extend from opposite sides of the central portion 58 so as to be coaxial with this central portion. These shafts 62 are preferably of substantially the same or slightly smaller radii than the radii of the walls 52. The spout member 56 is dimensioned so that when the spout member 56 is in position these shafts 62 are engaged by the top 18 so as to be held in place. Also preferably, the cap member 16 is dimensioned with respect to various parts of the fitment member 32 and the spout member 56 so that the edge of the central portion 58 which is exposed at the top 18 lies in the same plane as the exposed surface of this top.

The spout member 56 includes an elongated passage 64 which extends completely through the central portion 58 and the spout 60 and which is adapted to be placed in alignment with a hole or opening 66 in the fitment member 32 at the base of the cylindrical wall 48. This opening 66 leads completely through the fitment member 32 into the interior of the skirt 20. Thus, the opening 66 leads into the interior of the bottle 14 when the closure 10 is mounted upon it.

During the use of this closure the contents of the bottle 14 may be removed from it by rotating the spout member 56 to an "open" position as indicated in FIG. 4 of the drawing in which the passage 64 is aligned with the opening 66. With the construction described, the end 68 of the slot 22 located generally in the interior of the top 18 acts as a stop so as to correctly position the spout member 56 in this open position. It will be obvious that during the rotation of the spout member 56 the walls 52 act as bearings, and that the closure 10 may be closed by rotating it from such an "open" position to a position as indicated in FIGS. 1 and 2 of the drawing.

Although the foregoing description technically describes the principal parts of the closure 10 and indicates its operation it does not completely indicate many different aspects of the present invention which are important to making this closure 10 commercially acceptable and desirable. One major feature with respect to the closure 10 is that the cap member 16 may be formed out of virtually any easily formed material. Thus, this cap member 16 can be molded from relatively inexpensive themosetting or thermoplastic resins and resin composition such as various rigid phenolic compositions or the like or even various different metals. It can also be formed out of comparatively resilient and flexible self supporting materials such as various known grades of polyethylene, polypropylene or the like.

If the cap member 16 is formed out of a rigid material it is necessary to form the fitment member 32 out of a comparatively flexible material such as either of the polyolefins indicated in the preceding so that this fitment member may be "snapped" into place by temporary deformation so that the flange 36 fits within the groove 26. Preferably this fitment member 32 is formed out of such a somewhat flexible, resilient material of a self-supporting diameter so as to include a projecting or extending sealing ridge or flange 70 which extends from the wall 48 a comparatively short distance completely around the opening 66. This ridge 70 when formed of such a flexible, resilient material resiliently bears against the exterior of the central portion 58 of the spout 60 to form a seal with respect to it at all times. Also, when the fitment member 32 is formed of such a material it may include a dependent beveled closure ring 72 of a flexible character which is adapted to engage the interior of the upper edge 30 of the neck 12 of the bottle 14 in order to form a seal with respect to it.

The closure 10 may also be conveniently manufactured so as to include an air vent opening 74 in the fitment member 32 when this fitment member is formed of a somewhat flexible and somewhat resilient material such as either of the polyolefins noted in the preceding. Preferably this venting opening is of very small diameter so as not to be "wetted" by most materials which will be used in connection with the closure 10 because of surface tension consideration. This tends to prevent any leakage through the vent opening 74. If desired, the extremity 76 of this opening 74 terminating in the cavity 44 may be tapered slightly so as to be capable of receiving a small plug 78 attached to the spout 60 in order to close this opening. Preferably the plug 78 should be slightly larger than the extremity 76 so as to cause a small, localized deformation in the body portion 34 of the fitment member 32 effectively causing a seal. It will be obvious that when the spout member 56 is rotated to an open position that the plug 78 will be removed from the opening 74, allowing air to enter the bottle 14 as material is moved through the passage 64.

When the venting opening 74 is used in connection with a plug 78 preferably the spout member 56 is formed of a rigid material such as any of the material indicated in the preceding discussion of the manufacture of the cap member 16. Such rigid materials may, of course, be used in forming the spout member 56 if such a plug 78 is not employed, and even when such a plug is used this entire spout member may be manufactured from a structurally comparatively rigid yet somewhat flexible and resilient material such as polyethylene or polypropylene. When the spout member 56 is formed of such a somewhat flexible and resilient material, it is considered that there is a tendency for temporary deformation of the central portion 58 of it to occur by virtue of contact with the sealing ring 70.

It will be apparent from the preceding discussion that it is possible to form both the cap member 16 and the spout member 56 of a somewhat flexible and resilient material of a self-supporting character such as a polyolefin when the fitment member 32 is formed of a rigid material. Normally, however, this is not preferred since it is desired to have the exterior or exposed parts of the complete closure 10 formed out of a composition capable of withstanding physical abuse. Such abuse will occur in various automatic capping machines or when containers using closures corresponding to the closure 10 are stacked upon one another. The completely flat upper surfaces of closures corresponding to closure 10 are considered to materially aid or facilitate such stacking.

One virtue of the closure 10 lies in the fact that the exterior configuration of the cap member 16 does not affect the operation of this closure. With the structure herein described, it is only necessary to change the part of the die set used in forming the cap member 16 corresponding to the exterior of this cap member 16 in order to provide complete closures having different appearances as may be desired by different manufacturers. Preferably, however, the cap member 16 in any closure 10 of this invention designed to be secured on a container should include serrations 80 in the nature of grooves which extend parallel to the axis of the skirt 20. This is because such serrations 80 facilitate a closure sash as the closure 10 being applied to the neck of a container by existing automatic machinery.

Such machines are well known to apply a considerable amount of force in twisting a closure upon a container. The use of such force with the closure 10 results in a component of force being exerted by the upper edge 30 against the fitment member 32; this in turn forces the fitment member 32 upwardly into tight contact with the spout member 56 around the sealing ring 70. Thus, when the closure 10 is used the placing of this closure upon a container tends to aid in deriving "extra" forces serving to form a seal, which forces are not achieved with closures of a dispensing variety in which all of the forces tending to form a seal are desired entirely from the internal structures within these closures. From a consideration of the above it will, of course, be recognized that the top 18 of the cap member 16 serves a "hold down function" with respect to the shafts 62 making this "extra" sealing action effective.

From a careful consideration of this specification it will be realized that the threads 28 on the cap member 16 may be referred to as "attaching means," and that various other substantially equivalent construction such as ridges used in a bayonet type joint, "shop" fit holding structures or the like, may be employed in place of these threads. It will also be realized that various other equivalent structures may be substituted for the groove 26 and the flange 36, and that these two coacting means may be referred to as "connecting means."

I claim:

[1. A closure which includes:

a cap member, a fitment member, and a spout member, said cap member including a top and a skirt dependent from the periphery of said top, attaching means formed on the interior of said skirt for attaching said skirt to a bottle neck, said cap member also including a top slot formed in said top, said top slot having ends, said fitment member fitting within said skirt adjacent to said top and including a cavity aligned with said slot, a curved wall located opposite said top at one end of said top slot, said curved wall extending about an axis, an opening leading from a central area of said curved wall through said fitment member and side slots extending from said cavity in alignment with said axis, each of said side slots extends to the surface of said fitment member adjacent to said top, said spout member including a cylindrical central portion, a spout extending from said central portion, a passage extending through said spout and said central portion, and aligned trunnions fitting within said side openings, said trunnions being engaged by said top of said cap member so as to rotatably hold said spout member against said fitment member, said spout member being capable of being rotated so as to place said passage in alignment with said opening and normally fitting against said fitment member so as to form a seal with respect to said opening.]

2. A closure for use with a bottle neck having an end which includes:

a cap member, a fitment member, and a spout member, said cap member including a top and a skirt dependent from the periphery of said top, attaching means formed on the interior of said skirt for attaching said skirt to a bottle neck, said cap member also including a top slot formed in said top, said top slot having ends, said fitment member fitting within said skirt adjacent to said top and including a cavity aligned with said slot, a curved wall located opposite said top at one end of said top slot, said curved wall extending about an axis, an opening leading from a central area of said curved wall through said fitment member and side slots extending from said cavity in alignment with said axis, each of said side slots extends to the surface of said fitment member adjacent to said top, said spout member including a cylindrical central portion, a spout extending from said central portion, a passage extending through said spout and said central portion, and aligned trunnions fitting within said side openings, said trunnions being engaged by said top of said cap member so as to rotatably hold said spout member against said fitment member, said spout member being capable of being rotated so as to place said passage in alignment with said opening, and normally fitting against said fitment member so as to form a seal with respect to said opening, said attaching means formed on the interior of said skirt being capable of connecting said closure to coacting attaching means on a bottle neck so as to hold the end of said bottle neck against said fitment member, forcing said fitment member into engagement with said spout, causing said trunnions to be engaged by said top, so as to result in a seal being formed between said cylindrical portion of said spout member and said grooved wall of said fitment member around said opening in said fitment member.

3. A closure as defined in claim 2 including:

coacting connecting means formed on said fitment member and said cap member, said coacting connecting means preventing said fitment member from moving through said skirt.

4. A closure as defined in claim 3 wherein said connecting means on said cap member comprises a groove within the interior of said skirt and wherein said connecting means on said fitment member comprises a flange fitting within said groove.

5. A closure as defined in claim 2 including a deformable sealing ring formed on said curved surface of said fitment member so as to extend therefrom into engagement with said cylindrical portion of said spout member, said sealing ring extending completely around said opening leading through said fitment member.

6. A closure as defined in claim 2 including coacting means formed on said cap member and said fitment member for holding said fitment member in alignment with said cap member.

7. A closure as defined in claim 6 wherein said alignment means on said cap member comprises studs extending from said top of said cap member within the interior of said skirt and wherein said coacting alignment means in said fitment member comprises holes located within said fitment member, said holes in said fitment member being engaged by said studs.

8. A closure as defined in claim 2 wherein said top slot extends from the central region of said top to the periphery of said top and into a portion of said skirt adjacent to said top, and wherein said spout member is capable of being rotated so as to fit within said top slot and said cavity.

9. A closure as defined in claim 2 wherein said cap member and said spout member are formed of a flexible, resilient material and wherein said fitment member is formed of a rigid material.

10. A closure as defined in claim 2 wherein said cap member is formed of a rigid material and wherein said fitment member and said spout member are formed of a flexible, resilient material.

11. A closure as defined in claim 2 wherein said cap member is formed of a rigid material and wherein said spout member is formed of a rigid material and said fitment member is formed of a flexible, resilient material.

12. A container and closure combination which includes:

a container having a neck extending therefrom;

a closure having a cap member, a fitment member and a spout member;

said fitment member having a top and a bottom and an opening therethrough, said bottom of said fitment member being in sealing engagement with said container neck so as to close said container neck except for said hole through said fitment member, said fitment member having journal openings in its top adjacent said opening;

said spout member including shaft means formed thereon, said shaft means being positioned in said journal openings so as to position one end of said spout member adjacent said opening in said fitment member, said spout member including a passage extending therethrough and positioned so that when said spout member is rotated about said shaft means said passage becomes aligned with said opening in said fitment member;

said cap member being engaged over said shaft means, over said top of said fitment member and being secured to said container neck so as to cause force between said spout member and said fitment member in order to create a seal around said opening in said fitment member and said passage in said spout member and to hold said fitment member in engagement with said neck so as to maintain the seal therewith.

*13. A closure in combination with a container which includes:*

*a cap member, a fitment member, a spout member and a container having a neck,*

*said cap member including a top and a skirt dependent from the periphery of said top, attaching means formed on the interior of said skirt for attaching said skirt to said container neck, said cap member also including a top slot formed in said top, said top slot having ends,*

*said fitment member fitting within said skirt adjacent to said top,*

*means on said spout and on said fitment pivotally mounting said spout for movement between a dispensing position and an inoperative position,*

*an opening leading from a central area through said fitment member,*

*said spout member including a cylindrical central portion, a spout extending from said central portion, a passage extending through said spout and said central portion, said mounting means consisting of side openings located on said fitment and aligned trunnions fitting within said side openings, said trunnions on said spout being engaged by said top of said cap member so as to rotatably hold said spout member against said fitment member, said spout member being capable of being rotated so as to place said passage in alignment with said opening and normally fitting against said fitment member so as to form a seal with respect to said opening;*

*said cap member being secured to said container neck with said fitment member abutting against said container neck so that said cap member, by virtue of being secured to said container neck, holds said spout member against said fitment member in order to create a seal around said opening in said fitment member.*

References Cited

The following references, cited by the Examiner, are of record in the patented file of this patent or the original patent.

UNITED STATES PATENTS

| | | | |
|---|---|---|---|
| 2,701,668 | 2/1955 | Zayan | 222—542 X |
| 2,790,582 | 4/1957 | Halpern | 222—484 X |
| 2,793,795 | 5/1957 | Wilson et al. | 222—536 |
| 2,938,653 | 5/1960 | Church et al. | 222—536 |
| 2,981,447 | 4/1961 | Jennings | 222—484 |
| 3,023,939 | 3/1962 | Gustafson | 222—536 |
| 3,089,626 | 5/1963 | Kubiliunas | 222—484 |

RAPHAEL M. LUPO, *Primary Examiner.*